United States Patent
Hayashi et al.

[15] 3,689,126
[45] Sept. 5, 1972

[54] INTEGRAL BEARING MOUNTING AND DISMOUNTING APPARATUS

[72] Inventors: Masahiro Hayashi; Koichi Seki; Hiroshi Chinbe, all of Hitachi, Japan

[73] Assignee: Hitachi, Ltd., Tokyo, Japan

[22] Filed: April 13, 1971

[21] Appl. No.: 133,515

[30] Foreign Application Priority Data

April 17, 1970 Japan .................... 45/32343

[52] U.S. Cl. ............... 308/207, 308/189, 308/237
[51] Int. Cl. ............................................ F16c 35/06
[58] Field of Search ............. 308/20, 189, 207, 237

[56] References Cited

UNITED STATES PATENTS 3,080,199  3/1963  Rickley ................ 308/207 R
2,729,260  1/1956  Matson ...................... 151/67
2,400,348  5/1946  Greene ....................... 151/67
1,699,330  1/1929  Gayman .................... 308/207
3,428,373  2/1969  Imse ............................ 308/20

FOREIGN PATENTS OR APPLICATIONS 999,863  7/1965  Great Britain ............... 308/20

Primary Examiner—Martin P. Schwadron
Assistant Examiner—Barry Grossman
Attorney—Craig, Antonelli & Hill

[57] ABSTRACT

A retainer which retains a bearing for supporting a roll neck in a predetermined position and a lock nut are engaged with each other by means of a rod member without use of screw engagement, whereby the bearing is firmly fixed at right position and the mounting and dismounting thereof is easily facilitated.

8 Claims, 3 Drawing Figures

INTEGRAL BEARING MOUNTING AND DISMOUNTING APPARATUS

BACKGROUND OF THE INVENTION

The present invention relates to an apparatus for mounting and dismounting a bearing which supports a roll.

Generally, this kind of integral bearing which supports a roll at the roll neck is composed of a bearing to support the roll neck thereby, a retainer to retain the bearing in the prescribed position, a lock nut for locking the retainer and so forth. In order to remove the bearing from the roll neck, a complex operation as follows has been conducted. That is, a screw bolt fixing the lock nut to the retainer is first unscrewed, then the lock nut is removed from a half-divided threaded ring and the half-divided threaded ring having a key is removed from a key groove on the roll neck, and then the bearing is slided along the axial extention of the roll together with the retainer. Thus, the bearing is dismounted from the roll neck.

However, in the conventional construction of the integral bearing in which a screw bolt is used to avoid the slackness between the lock nut and the retainer, there has been a disadvantage that the screw engagement between the breakage of screw in the engagement between the lock nut and the bolt take place due to the vibration and shock made by the rotation of the roll and the change of rotating direction of the roll, so that the dismounting of the roll neck and the bearing becomes very difficult. Further, in this construction, the mounting and dismounting operation is troublesome and it is very difficult to manually mount and dismount the bearing in the event that the lock nut is of large weight, since the retainer and the bearing should be separately mounted and dismounted before or after the lock nut is mounted or dismounted in the case that the the integral bearing is mounted to or dismounted from the roll neck. Still further, in this conventional construction, there has been a danger in mounting the integral bearing to the roll neck such that the retainer which is to be mounted together with the bearing but not secured thereto is liable to drop off the bearing in the case that the key secured to the retainer is not in alignment with the key groove on the roll neck when the retainer is mounted to the roll neck.

SUMMARY OF THE INVENTION

The primary object of the present invention is to provide an integral bearing mounting and dismounting apparatus in which the integral bearing to support a roll can be easily and securely mounted and dismounted, and further integral bearing can be firmly secured to support the roll neck even at the position where it is subject to vibration and shock.

In accordance with the present invention, there is provided an integral bearing mounting and dismounting apparatus comprising a bearing for supporting a roll neck, a retainer slidable in the axial direction for retaining the bearing, a lock nut disposed on the roll neck and integrally engaged with the retainer, a half-divided ring interposed between the lock nut and an angular projection provided on the roll neck, a rod member fitted in the holes provided in the retainer and the lock nut respectively without use of screw engagement.

DESCRIPTION OF THE PREFERRED EMBODIMENT

Figure 1:
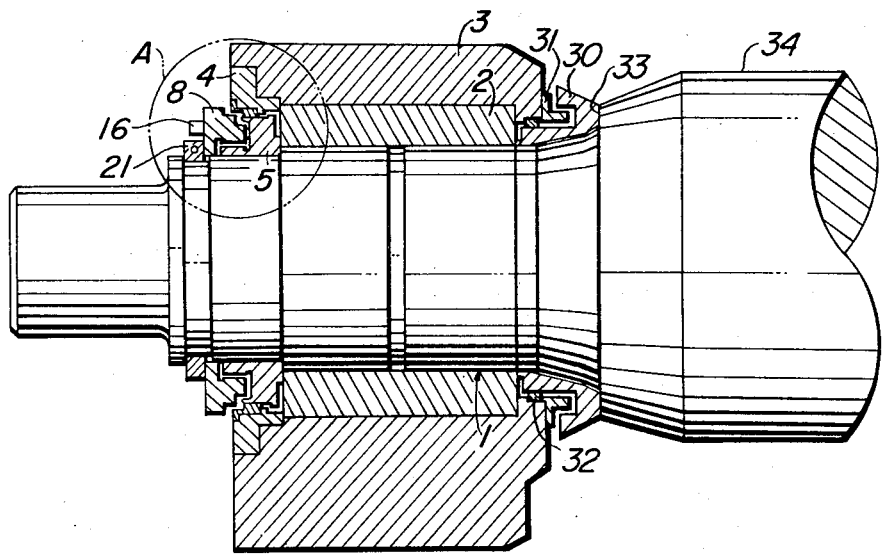
FIG. 1 is a vertical sectional view showing the integral bearing and the relevant portions presented in connection with the present invention.
Figure 2:
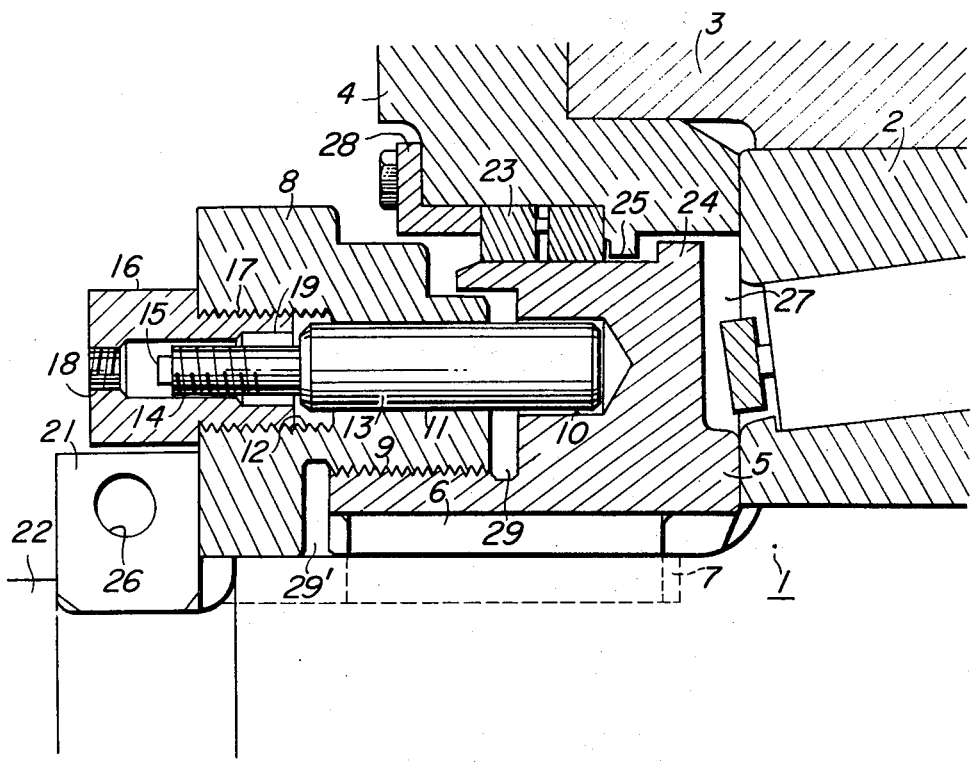
FIGS. 2 and 3 are enlarged detailed sectional view showing the construction of the integral bearing in accordance with the present invention shown at A-portion in FIG. 1.

Now the present invention will be described in detail with respect to an embodiment referring to the drawing. The reference numeral 1 shows a roll neck extending in the axial direction from a shoulder 33 of a body portion 34 and supported by a metal chock 3 with the intervention of a bearing 2, and the metal chock 3 is fixed between the shoulder and the bearing by a supplement 30, and stoppers 31, 32. The numerals 4 and 5 show a retainer member for retaining the bearing 2 which is divided into an outer retainer 4 being in contact with the metal chock 3 and an inner retainer 5 being in contact with the roll neck 1 and being slidable along the axial extention of the roll. The inner retainer 5 is mounted on the roll neck 1 through engagement of a key 6 of the retainer with a key groove 7 provided on the roll neck 1. The reference numeral 8 shows a lock nut integrally mounted to the inner retainer 5 through the screw engagement 9. The reference numeral 10 shows a bottomed hole provided in the inner retainer 5, 11 shows a hole provided in the lock nut 8, 12 shows a female screwed hole provided in the lock nut 8 connected with the hole 11 having a slightly larger diameter than that of the hole 11, and 13 shows a rod member fitted in the holes 10 and 11 to prevent a relative motion in the circumferential direction of the lock nut 8 and the inner retainer 5. For example, a knock pin is used as the rod member 13. The rod pin 13 is provided at the rear end portion thereof with a male screw portion 14 and a projection 15. The reference numeral 16 shows an integral bolt provided at the center thereof with a non-circular hole 19 into which the rear end of the knock pin 13 is inserted and the spanner 20 hereinafter described is inserted. The integral bolt 16 is further provided on the front external periphery thereof with a male screw portion 17 to be screwed into the female screw hole 12 and on the rear internal periphery thereof with a female screw 18 to be engaged with the male screw 14. The reference numeral 20 shows a loosening and tightening device for loosening and tightening the integral bolt 16 such as a hexagonal rod spanner. The reference numeral 21 shows a half-divided ring interposed between an angular projection 22 on the roll neck 1 and the lock nut 8, the half-divided ring of which a divided portion is provided with a bolt 26 for fixing is so constructed as capable of dismounting from the roll neck portion. 23 shows an oil seal means disposed between the outer retainer 4 and the inner retainer 5, and numerals 24 and 25 show protrusions provided on the inner retainer 5 and the outer retainer 4 respectively. A space 27 formed between the bearing and retainers 4, 5 is filed with a lubricant, the oil seal means 23 is secured by a fetter 28 to the outer retainer 4.

Figure 3:
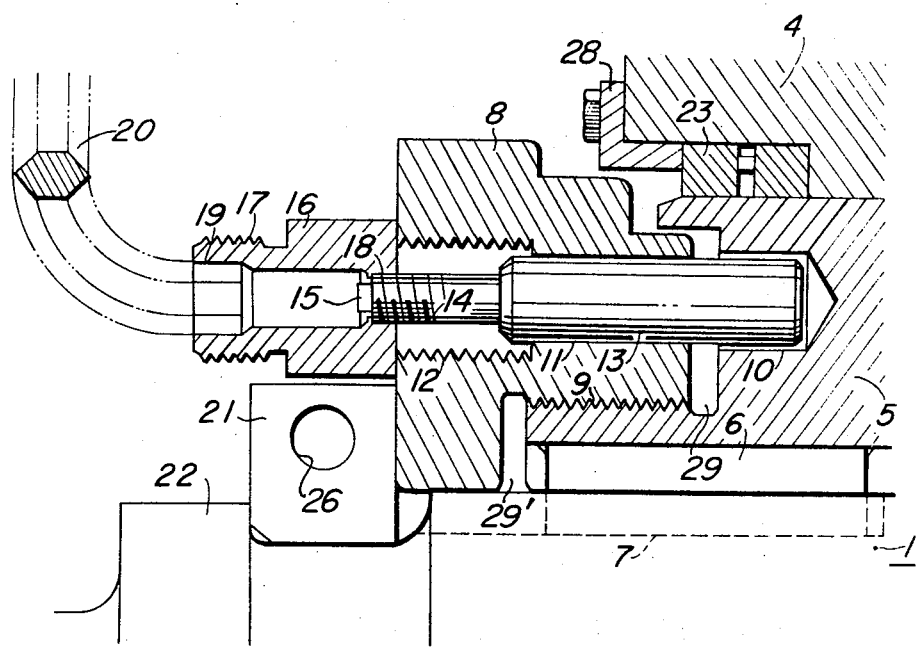

In the construction of the integral bearing mounting and dismounting apparatus in accordance with the present invention as described above, the knock pin 13 should be removed at first when the bearing 2 is to be dismounted from the roll neck 1. For this purpose, after the integral bolt 16 is removed from the lock nut 8, the integral bolt 16 is reversed as shown in FIG. 3 so that the female screw portion 18 may be engaged with the male screw portion 14 of the knock pin 13, and then the knock pin 13 is pulled out of the holes 10 and 11 by the use of the spanner 20 fitted in the hole 19 of the integral bolt 16. Thus, the knock pin 13 is removed from the inner retainer 5. Between the retainer 5 and lock nut 8 are formed gaps 29, 29', so that by turning the retainer 5 and lock nut 8 in the opposite direction, the length of them can be changed. Accordingly when, the lock nut 8 is rotated to move it to the right, the half-divided ring 21 and the lock nut 8 are loosened relative to each other. After the bolt 26 of the ring 21 is pulled out, the ring 21 is dismounted from the roll neck. In this condition, the bearing 2 can be dismounted together with the metal chock 3, the retainer 4 and 5 and the lock nut 8.

In the operation of mounting the bearing, the above described operation for dismounting the bearing may be conducted in the reversed order.

At this time, even in case of mounting the bearing with the key 6 of the retainer being out of alignment with the key groove 7 of the roll neck, there is no fear of dropping the retainer 5 owing to engagement of the retainer 5 with the lock nut 8 and the provision of the protrusions 24 and 25 to hold the inner retainer 5 engaged with the outer retainer 4. Further, since the lock nut 8 is fixed to the retainer 5 by means of a knock pin 13 not by screw engagement, thereby to prevent the lock nut 8 and the retainer 5 from their circumferential rotation there is no fear of breakage of the screw due to the vibration and the like.

As apparent from the above description, in accordance with the present invention, the mounting and dismounting of the integral bearing with respect to the roll neck can be easily and securely conducted. Further, it will be noted that the bearing is firmly fixed to the roll neck even at the position where the vibration and shock are exerted.

We claim:

1. Bearing mounting and dismounting apparatus comprising: a bearing disposed within a chock member for supporting a neck portion of a roll; retainer means slidable in the axial direction of the roll axis for preventing movement of said bearing in the axial direction; a lock nut disposed on said neck portion for fixedly supporting said retainer means on said neck portion, said lock nut including means for dismounting said lock nut together with said retainer means from the roll; a ring divided into halves and insertable between a projection formed on said neck portion and said lock nut for preventing movement of said lock nut in the axial direction, ring dismounting means for dismounting said ring from said neck portion, a first axially extending aperture formed in said retainer means, a second axially extending aperture formed in said lock nut, a rod member non-threadably insertable through said first and second apertures, and means on said rod member for pulling said rod member out of said apertures.

2. An apparatus as defined in claim 1, wherein said retainer is divided into an outer retainer member which is in contact with the chock member and an inner retainer member which is in contact with the neck portion and is slidable in the axial direction of the roll, wherein sealing material is interposed between the outer and inner retainer members, and wherein the outer and inner retainer members are each provided with protrusions for engagement with respective corresponding protrusions on each other.

3. An apparatus as defined in claim 1, wherein the lock nut is screwed to the inner retainer member and disposed on the roll neck, wherein said first aperture extends into said inner retainer member, and a third aperture is provided in said lock nut which is connected with said second aperture and is of a slightly larger diameter than said second aperture.

4. An apparatus as defined in claim 1, further comprising an integral bolt, wherein said rod member is tightly and non-threadably fitted in the first and second apertures, and wherein the rear end of the rod member is provided with a male screw portion to be engaged with female screw threads of the integral bolt.

5. An apparatus as defined in claim 1, further comprising an integral bolt, wherein said integral bolt is provided on the outer periphery thereof with a male screw portion to be screwed into a female screw of the lock nut, and wherein said integral bolt is provided on the inner periphery thereof with a non-circular hole to receive therein a bolt rotating means for rotating the integral bolt to pull the rod member out of the first and second apertures.

6. Bearing mounting and dismounting apparatus adapted for use with a roll having a neck portion to be supported by means of a bearing assembly which extends along a longitudinally extending roll axis from a shoulder delimiting one end of said neck portion of said roll, said neck portion having a smaller diameter than a body portion of said roll, said neck portion having an angular projection at an end thereof, in which said bearing assembly comprises: a bearing member for directly supporting said neck portion; a chock member, a supplement inserted between said shoulder and an end of said bearing member for preventing movement of said chock member in the direction of the roll axis; a first retainer of which one end tightly contacts with the other end of said bearing, a second retainer surrounding said first retainer, said first retainer having a straight projection inserted into a straight groove formed in said neck portion and extending along the roll axis, said straight groove being opened at one end, said second retainer being fixed to one side of said chock member, said first and second retainer being in oil-tightly contact with each other through sealing means and respectively having stopping projections opposing each other, said first retainer being provided with a first aperture extending along the roll axis; a locking member having a second aperture extending therethrough, said locking member further having screw means engageable with screw means formed in said first retainer, a stopping portion being provided on said locking member at the side of said end of said neck portion; a ring member divided into halves and tightly inserted between said angular projection and said stopping portion of said locking member; means for fixing said ring member to said angular projection, and a rod member inserted through said first and second apertures for stopping a relative rotation of said first retainer and said locking member in a circumferencial direction with respect to the roll axis, said rod member being non-threadably inserted into said apertures; gaps being formed between said first retainer and said locking member so as to permit a change of the length in the roll axis direction of said first retainer and said locking member upon a relative rotation thereof.

7. An apparatus according to claim 6, in which said rod member is provided with means for pulling said rod member out of said apertures.

8. An apparatus according to claim 6, in which a pulling member for pulling said rod member out from said apertures is fitted on said second aperture of said locking member, said pulling member being provided with a hollow portion where an end portion of said rod member is accommodated.

* * * * *